US010083052B1

(12) United States Patent
Venkatraman et al.

(10) Patent No.: US 10,083,052 B1
(45) Date of Patent: Sep. 25, 2018

(54) STREAMLINED REMOTE APPLICATION STREAMING TECHNOLOGY CONFIGURATION AND USAGE

(71) Applicant: Amazon Technologies, Inc., Seattle, WA (US)

(72) Inventors: Ajith Kuttai Venkatraman, Seattle, WA (US); Collin Charles Davis, Seattle, WA (US); Pavan Kumar Surishetty, Seattle, WA (US); Anantha Venkateshwaran Balasubramaniam, Seattle, WA (US); Jesen Kwok Ha, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/638,798

(22) Filed: Mar. 4, 2015

Related U.S. Application Data

(60) Provisional application No. 62/082,605, filed on Nov. 20, 2014.

(51) Int. Cl.
*G06F 9/455* (2018.01)
*G06F 8/61* (2018.01)

(52) U.S. Cl.
CPC ............ *G06F 9/45533* (2013.01); *G06F 8/61* (2013.01)

(58) Field of Classification Search
None
See application file for complete search history.

(56) References Cited

U.S. PATENT DOCUMENTS

| | | | | |
|---|---|---|---|---|
| 9,286,102 B1* | 3/2016 | Harel | ................. | G06F 9/45558 |
| 2003/0126202 A1* | 7/2003 | Watt | ..................... | G06F 9/4401 |
| | | | | 709/203 |
| 2009/0288084 A1* | 11/2009 | Astete | ................ | G06F 9/45533 |
| | | | | 718/1 |
| 2012/0092277 A1* | 4/2012 | Momchilov | ............ | G06F 3/038 |
| | | | | 345/173 |
| 2013/0066770 A1* | 3/2013 | Das | ....................... | H04L 67/02 |
| | | | | 705/39 |
| 2015/0134840 A1* | 5/2015 | Thompson | ............ | H04L 67/141 |
| | | | | 709/228 |
| 2015/0227567 A1* | 8/2015 | Zamir | ..................... | H04L 67/10 |
| | | | | 709/223 |
| 2015/0355932 A1* | 12/2015 | Hiebert | ................ | G06F 9/45558 |
| | | | | 718/1 |

OTHER PUBLICATIONS

Bar; AWS Official Blog Category: Amazon AppStream; 2014; accessed Mar. 13, 2015; 18 pages.

* cited by examiner

*Primary Examiner* — Sisley Kim
(74) *Attorney, Agent, or Firm* — Baker & Hostetler LLP

(57) ABSTRACT

Initial configuration of access for a client device to a streamed application may be initiated in response to receiving a request to enable access. The application may not, in some cases, have been configured for streaming. The application may execute on a virtual computing node assigned to run the application in the context of a user account created to run the application. A link for initiating the application stream may be sent to the client. A capture process detects resources accessed by the application and streams them to the client. Input from the client is inserted into the application's input/output streams by the capture process.

19 Claims, 8 Drawing Sheets

STREAMLINED REMOTE APPLICATION STREAMING TECHNOLOGY CONFIGURATION AND USAGE

CROSS REFERENCE TO RELATED APPLICATIONS

This application claims benefit under 35 U.S.C. § 119(e) of the U.S. Provisional Patent Application No. 62/082,605, filed Nov. 20, 2014, the contents of which are incorporated herein by reference in its entirety.

BACKGROUND

Recent technological advances have improved the ability to transmit and deliver information in a fast and efficient manner. In accordance with such advances, it is becoming increasingly popular to acquire and store data at a central provider location and to deliver the data to end users quickly upon request. This model may employ technological concepts, such as streaming, in which content may be constantly received by and presented to an end user while being delivered to and maintained by a provider. One rapidly expanding area is the use of streaming technology to deliver application content. When streaming application content, a provider may execute an application to produce content and then encode and transmit the images to a client over a network, such as the Internet.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Techniques for initializing access to an application that executes remotely are described herein. The techniques involve an initial configuration of an application stream, whereby content generated by an application running on remote computing nodes is provided to a local computing device through the application stream, without the installation of complicated software on the local (or client) computing device.

Initializing access to a streamed application may involve operations for allocating and configuring virtual computing nodes to run the application, providing connection information to the client device, and performing a capturing process by which content created by the application is captured and transmitted to the client device. In addition, the capturing process can involve identifying input/output streams associated with the application, receiving input on the client device that corresponds to the input/output streams, and inserting the input into the input/output streams for processing by the application.

Streaming an application may involve transmitting graphical, audio, or other output from an executing application to a remote client, and receiving, from the remote client, input of various forms. Non-limiting examples of input types include mouse, keyboard, pen, gesture, and audio input. These and other forms of input can be transmitted by the remote client, routed to the appropriate computing node, and inserted into the input stream of the application. The application may then process the input, and in so doing produce various forms of output, some or all of which may be transmitted to the remote client. This approach may be used to simulate the effect of executing the application on the remote client.

The input and output sent between the remote client and the application is generally transmitted through data channels that may be referred to as streams. A stream generally refers to data transmissions that have at least the appearance, relative to the type of data being transmitted, of being continuous. For example, a stream of video data that updates at 60 frames per second may involve nearly continuous transmission, while input data might involve data transmissions relatively infrequently, such as in response to a mouse movement initiated by a user.

Figure 1:
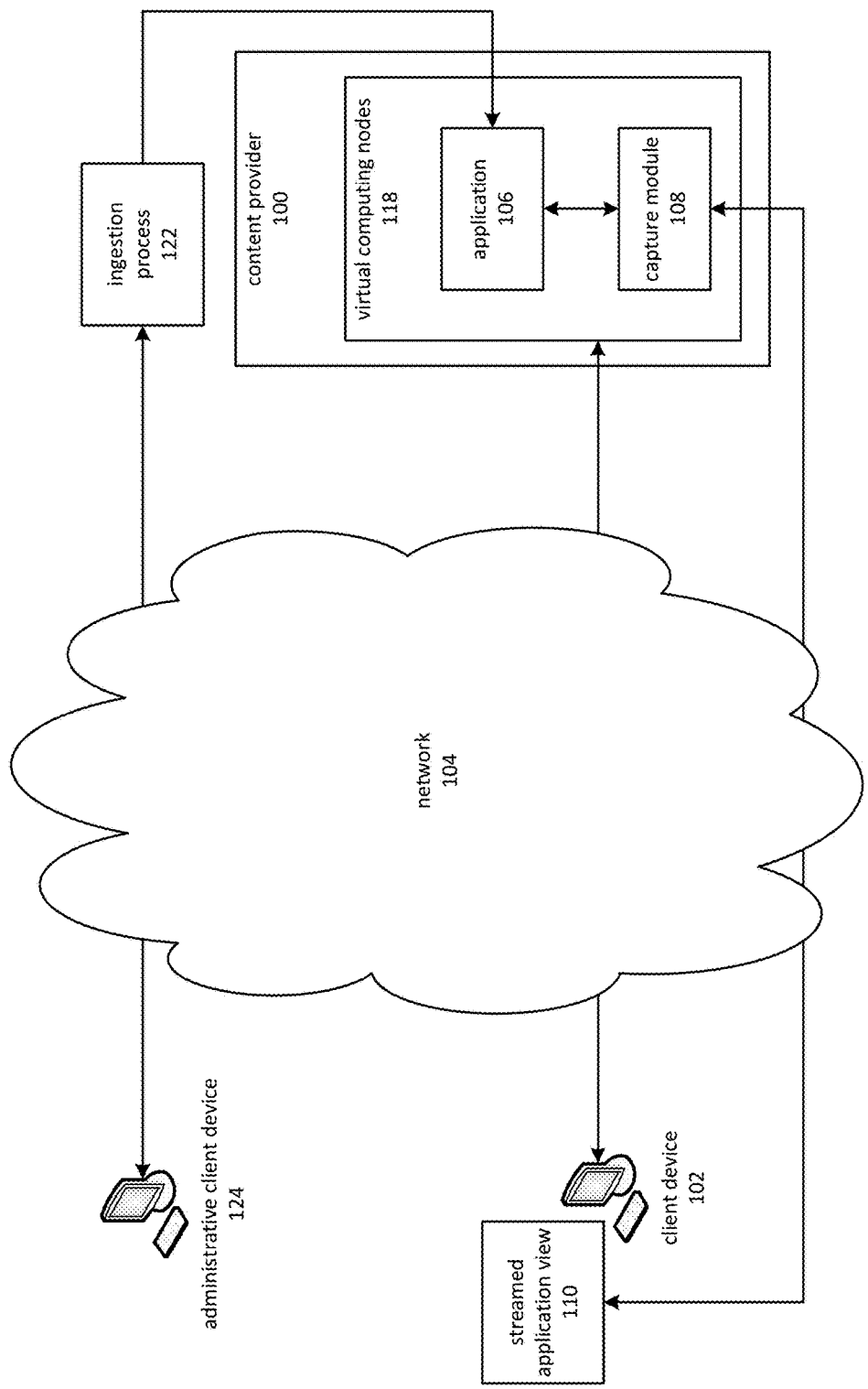
FIG. 1 is a block diagram depicting an example of a system for enabling a client device to access a streamed application.

FIG. 1 is a block diagram depicting an example of system for enabling a client device to access streamed content, for example a computer application, such as a word processing application, computerized spreadsheet, computer-aided design application, and so forth. This may include existing programs not necessarily adapted to streaming, such as WORD, EXCEL, and AUTOCAD. Content provider 100 may publish or advertise the availability of applications to be streamed in various ways, such as through a console or other means. In some instances, any application that is available on a virtual computing node may be made available for streaming. A user of client device 102 might see a program operating on one of the virtual computing nodes 118, and then select it for streaming locally. In another instance, a user might select an application for streaming from a list of applications in a console used for management of services related to the services of content provider 100.

A content provider 100 may operate a fleet of virtual computing nodes 118, which may be hosted on computing devices (not shown) at a data center remote to a client device 102. Content provider 100 may operate the fleet of virtual computing nodes 118 on a pooled basis so a number of unallocated virtual computing nodes are ready, at any given time, to execute an application that might be streamed. Content provider 100 may keep this fleet of virtual computing nodes 118, or a selected group of computing nodes, in a "hot" or "warm" pooled state, so that computing resources are available to the client device 102 when requested by the client device 102 with little to no waiting for the virtual computing nodes 118 to be brought online and initialized.

As set forth above, content may be provided by a content provider to one or more client devices, such as client device 102. The term "content," as used herein, refers to any presentable information such as audio, video, numeric, or textual information, and the term "content item," as used herein, refers to any collection of any such presentable information. Non-limiting examples include audiovisuals, reports, documents, and other forms of application output. A content provider 102 may, for example, provide one or more content providing services, sometimes referred to as hosted applications, for providing content to client devices. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting client devices.

An ingestion process 122 may result in the application being made available for streaming. In some instances, this may comprise an administrator using administrative client device 124 to log onto a console with administrative credentials. The virtual image may be taken from a pre-warmed pool of virtual machines, so that the administrator experiences little delay in obtaining a clean virtual machine image on which the application can be installed. This may, for example, be accomplished by initializing virtual machines with an operating system and other baseline software, starting the virtual machine, and suspending the virtual machine in a readied state. The virtual machine may then be allocated for use in streaming an application and made accessible to an administrator or an executable process for performing administrative functions. After the administrator has been verified with its login information, the administrator is presented with the instance of the virtual machine. The administrator may then install an application or program onto a virtual machine. The application or program may be downloaded from storage, including remote cloud storage devices.

An image may then be prepared for use by allowing the administrator to access an instance of a virtual computing node and installing the application on it. The administrator may then associate that installed application or program with an application or component that allows users to remotely access and stream that application or program at a later time. For example, the administrator may associate the installed application or program with an icon or link, so that a user may subsequently initiate the application or program by selecting the icon or link. After the administrator has installed the program on the instance, a snapshot may then be taken of the image. In some embodiments, the installation may be performed through an administrative process after the administrator has selected it. Once the image has been defined, it may then be associated with the application.

In one example of preparing an application for streaming, an administrator may view a console application that provides a view of virtual computing infrastructure made available by a content provider. The console may be accessed through a client device, such as administrative client device 124. The administrator may select a program for providing to users as a streamed application. For example, the administrator might select a computer-aided design ("CAD") program for streaming to client devices, such as client device 102. In response to the selection, the system depicted by FIG. 1 may prepare a virtual computing node image that includes the CAD program and pre-populate a pool of virtual computing nodes that were started using the image.

After an application 106 has been selected as a candidate for streaming to client devices, it may be selected for streaming to client device 102. The system may then perform operations to prepare for streaming to client device 102, such as identifying a virtual computing node, in a pool of such nodes, which was initialized using a virtual machine image that comprises the application 106.

The application 106 may be started on a virtual computing node based on a link or other information that is usable for identifying the application 106. In some cases, additional information may be used, such as the user account under which application 106 may run, or a computing node that has been allocated to run an instance of application 106 for the client device 102. This additional information may not be explicitly stored on client device 102. In addition, no installation of specialized software need occur on the client device 102. In some instances, however, an icon or other information referring to the link might be installed, for convenience, on the client device 102. In other cases, client device 102 may access an application console through which streamed applications may be accessed.

A link to an application may include or refer to information that can be used for security purposes, e.g., to verify that the client device 102 is allowed to access virtual computing nodes 118 and/or application 106. In some cases, a token or other identifier may be passed using the link to content provider 100, which may use the token to retrieve information corresponding to the token and verify the credentials. The content provider 100 may also maintain credentials (e.g., a password) associated with the user account that will be used to run application 106. These can be retrieved using the token, and then used to connect, log on, and execute application 106 on the selected one or more of virtual computing nodes 118.

A capture module 108 monitors application 106 to identify elements of application 106 for streaming. The elements may comprise user interface elements such as windows, menus, dialog boxes, and other graphical indicia. The term "windows," as used herein, may refer to any of these elements. The elements that may be captured also include files accessed by the application, resources used, child processes launched, and so on.

The elements captured by capture module 108 may be streamed to client device 102. The streaming may comprise reproducing the elements on client device 102, or providing access to the elements. For example, windows and other elements might be reproduced to form streamed application view 110, and files or other resources created or modified by application 106 might be made accessible to client device 102. In addition, portions of application 106 may be streamed while other portions are generated locally on client device 102, for example mouse cursors associated with the mouse on the client device 102.

The capture module 108 may also receive data indicative of input from a user of streamed application view 110 and insert it into an input/output stream associated with application 106. Typically, the insertion, sometimes referred to as injection, is done using an application programming interface provided by the operation. Injection or insertion may refer to causing data to be processed by the consumer of the stream. For example, mouse movements, mouse clicks, keyboard input, and so forth might be captured by client device 102 and transmitted over network 104 to capture module 108. The capture module 108 might then invoke the programming interface to inject the input into a corresponding input/output stream associated with application 106, which can then process the input.

Figure 2:
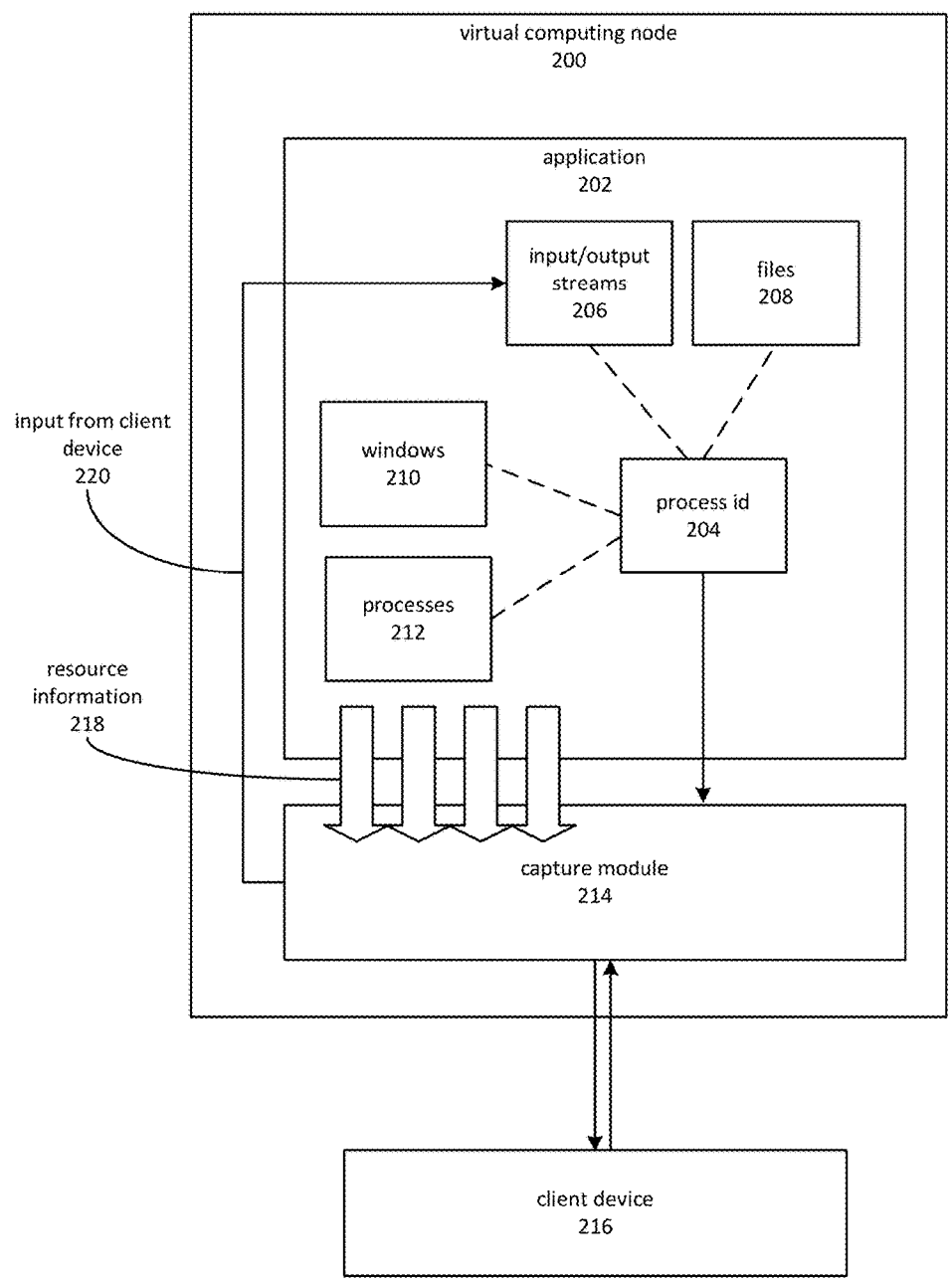
FIG. 2 is a block diagram depicting interaction between an application and a capture process.

FIG. 2 is a block diagram depicting interaction between an application and a capture process. An application 202 may run on a virtual computing node 200. The application 202 may be associated with a process id 204. The process id 204 may, for example, be a numeric value assigned by the operating system of virtual computing node 200 to an instance of application 202. Note that in some cases, an application may correspond to multiple instances of various executable processes. In such cases, rather than a single process id 204, a hierarchy of process ids that correspond to the instances of the executable processes may be employed. However, FIG. 2 depicts a single process id 204 in order to facilitate understanding of the present disclosure.

When application 202 creates, modifies, accesses, or deletes various resources, one or more process ids 204 may be linked to the action. For example, when application 202 creates a file, a record might be created by the operating system of virtual computing node 200 that indicates an association between process id 204 and the created file. When an executable process such as application 202 creates a window, process id 204 might be stored in memory structures describing the window. When a parent executable process creates a child executable process, an operating system record for the child process can include the parent process id. Embodiments may utilize process ids or other similar identifiers to track resources associated with application 202, including those resources created by child processes.

The resources created by application 202 may include windows 210, processes 212, input/output streams 206, and files 208. Resources related to an application may be detected by comparing a process id 204 or other identifier to information associated with the resource. A copy of the process identifier may, for example, typically be stored in a record associated with an open file or other resource. In some embodiments, mechanisms such as call interception, tracing, interrupt mechanisms and so forth may be used in addition to or instead of detection based on process id 204. For example, a mechanism might include trapping on a file creation call and examining the current state of the call stack to identify an executable process associated with application 202.

A capture module 214 may identify output associated with application 202 in order to transmit the output, via a stream, to a client device 216. Capture module 214 may, for example, be associated with or perform operations to detect resources associated with application 202, such as processes 212, windows 210, input/output streams 206, and files 208 created, modified, or deleted by application 202. In FIG. 2, resource information 218 depicts a flow of information from or concerning resources associated with application 202. These resources may include processes 212, windows 210, input/output streams 206, and files 208. The information may be collected by capture module 214 from monitoring of application 202 and virtual computing node 200, as well as operating system of virtual computing node 200, or other sources.

Capture module 214 may stream information describing the captured resources to a client device 216. Capture module 214 may determine which of such information should be streamed to the client device based on the client device's requests and/or permissions, and whether the piece of such information corresponds to the device's requests and/or permissions. The information may include various details about the resource, such as size, position, color, and so forth in the case of windows 210 or the contents or locations of files 208. In the case of processes 212, information about the process may, in some cases, be kept on virtual computing node 200. However, if one of the child processes 212 creates a window, file, or input/output stream, these may be streamed to client device 216. In addition, the capture module 214 may, in some instance, only capture data from the application 202 and not data (or graphics) of the underlying operating system. In this way, from the users' perspective, they see only the application on the screen and not the operating system environment on the virtual computing instance.

In some instances, capture module 214 may monitor applications running on virtual computing node 200 and determine streaming destinations based on information such as process id 204. Capture module 214 may, in some instances, refer to the user account (not shown) in which an application is running. A routing table or other structure may be maintained to record associations between streaming destinations—such as client device 216—and process ids. User account associations may also be maintained in the routing table. Capture module 214 may, based on the associations on the routing table or other structure, determine which applications and/or which resources of an application to stream, and to determine where to stream the applications and/or resources.

Data flowing through certain input/output streams generated by the application may also be transmitted to the client device 216, if appropriate to the streaming scenario. For example, sound output can be streamed to the client device 216 so that audio reproduction occurs locally, rather than at the data center.

Client device 216 may process signals from various input devices and transmit the data over a network, such as the Internet, to capture module 214. A routing mechanism, such as an internet protocol address and port number, may be used to direct a transmission containing the data to the computing device and virtual machine on which the capture module 214 is operating. Once the capture module 214 receives the input, it may insert the data into input/output streams 206. This is shown by the arrow marked as input from client device 220. For example, mouse input received on the client device 216 might be injected into a corresponding mouse input stream of input/output streams 206, for example using an application programming interface provided by the operating system. Embodiments may perform similar actions regarding other types of input. Injection of the input causes the application 202 to respond to the input by performing actions such as creating or modifying resources. For example, the application 202 might move the window in response to mouse movement. In some embodiments, software associated with the capture module 214 may be installed on client device 216. In other embodiments, no other software associated with the application or capture module 214 is required, for example, because of the processing performed on the application during the ingestion process described above.

The configuration of the capture module 214 described above allows streaming of an application that has not been specifically adapted or modified for streaming. It may also be applied, by tracking hierarchies of related processes that might be associated with application 202, to perform streaming in cases where the application 202 runs as multiple instances of various executable programs running on multiple virtual computing nodes.

Figure 3:
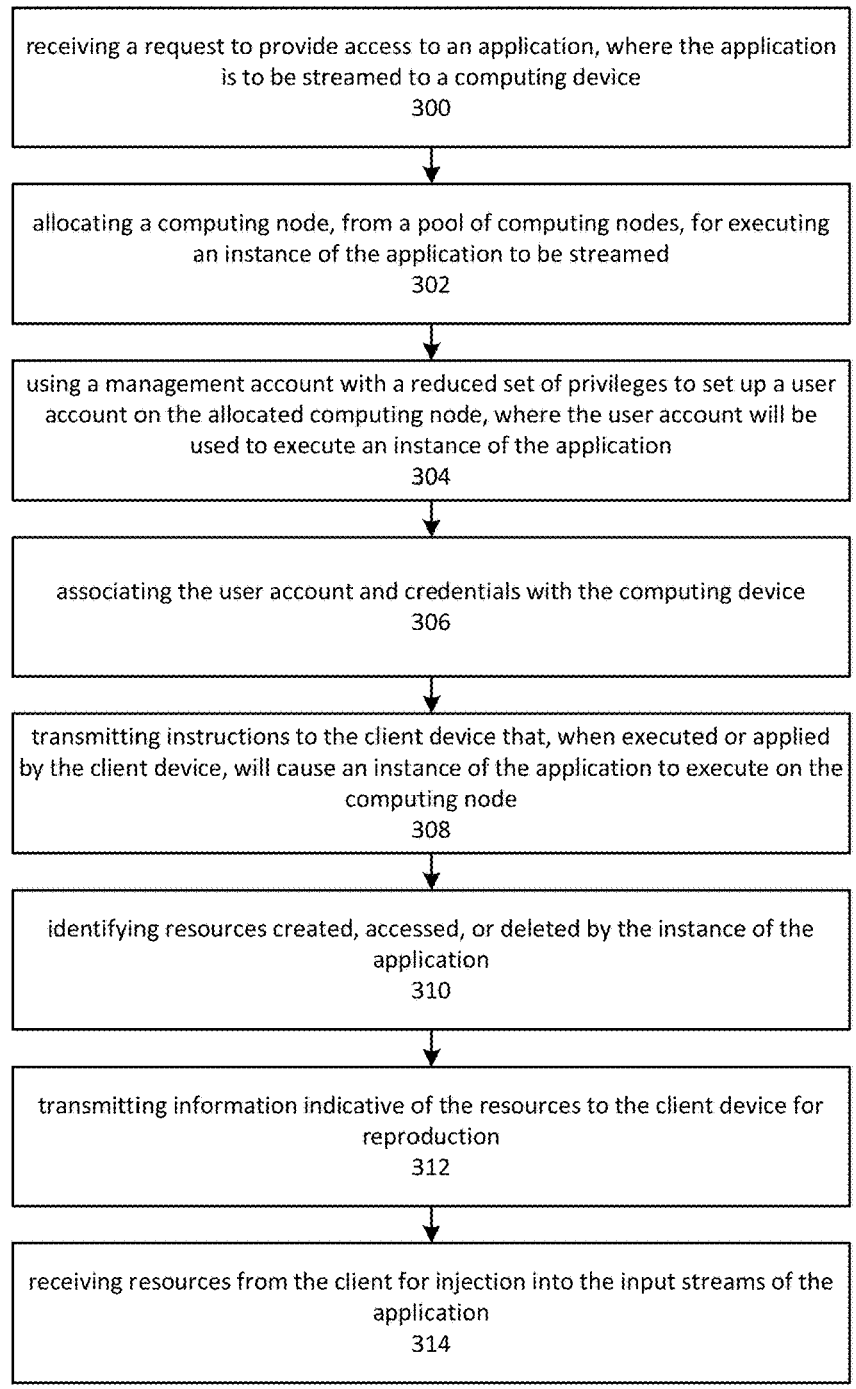
FIG. 3 is a flow diagram depicting an example of a process for streaming an application to a client device with minimized configuration effort and without requiring modification of the application in order to adapt it for streaming.

FIG. 3 is a flow diagram depicting an example of a process for streaming an application to a client device with minimized configuration effort and without requiring modification of the application in order to adapt it for streaming.

Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 300 depicts receiving a request to provide access to an application. The request may apply to scenarios in which the particular application to be streamed has not been previously made accessible to that particular client device. Furthermore, it could also be the case that the particular application to be streamed has not been specifically adapted for streaming. The request to provide access to an application may be preceded by a stage in which an administrator or other user determines that an application should be made available for streaming to client devices. Making the application available for streaming may be described as an ingestion process. An administrator may identify applications that may already run on virtual computing nodes operated by a content provider, or identify applications that may be installed to a virtual computing node operated by the content provider. In response to the request to be made available for streaming, embodiments may pre-populate a pool of virtual computing nodes that include the application. The request to provide access may then be satisfied using the pool of virtual computing nodes.

Block 302 depicts allocating a computing node, from a pool of computing nodes, for executing an instance of the application. A pool of computing nodes may be maintained so that the resources needed to run a streamed application may be made available with a minimized amount of delay, as referenced above.

Block 304 depicts using a management account to set up a user account on the allocated computing node, where the user account will be used to execute an instance of the application. Although depicted in FIG. 3 as being subsequent to block 302, various embodiments may perform this operation at different stages. In some instances, it may be desirable for the user account to be included in the virtual machine image, in which case the account might be added in response to determining that installation of the application has completed, and prior to formation of the image. In other instances, the user account might be added when the virtual machine is initialized. This approach might be employed when the identity of the user is not known at the time the image of the virtual machine is taken. In addition, the same account may share management and user privileges.

Block 306 depicts associating the user account referred to in block 304 with the client device. Alternatively, the user account may be associated with a particularly user of the computing device. The user account used on the virtual computing node to execute the application may be maintained in order to provide isolation from other users. Typically, the account used will not be the same as a user account used to access the streamed application on the client device.

Block 308 depicts transmitting instructions to the client device that, when executed or applied by the client device, will cause an instance of the application to execute on the computing node. This may comprise the information needed to transmit instructions to the virtual computing node, log on to the user account, and initiate the application in the context of the user account. The instructions might be in the form of a hyperlink, a web page, a configuration file, and executable file, and so on.

Block 310 depicts identifying resources created, accessed, or deleted by the instance of the application. This may be performed using the capture module described herein. The capture module may, as described, identify outputs or other resources associated with an application by comparing the process id of the application to an equivalent process id stored in records associated with various outputs.

Block 312 depicts transmitting information indicative of identified resources to the client device, for reproduction on the client device, or to provide some other mechanism for accessing the resource.

Block 314 depicts receiving resources from the client for injection into the input streams of the application. This may, for example, comprise transmitting mouse movements captured at a client device to the capture module for injection into the input/output stream of the application.

Figure 4:
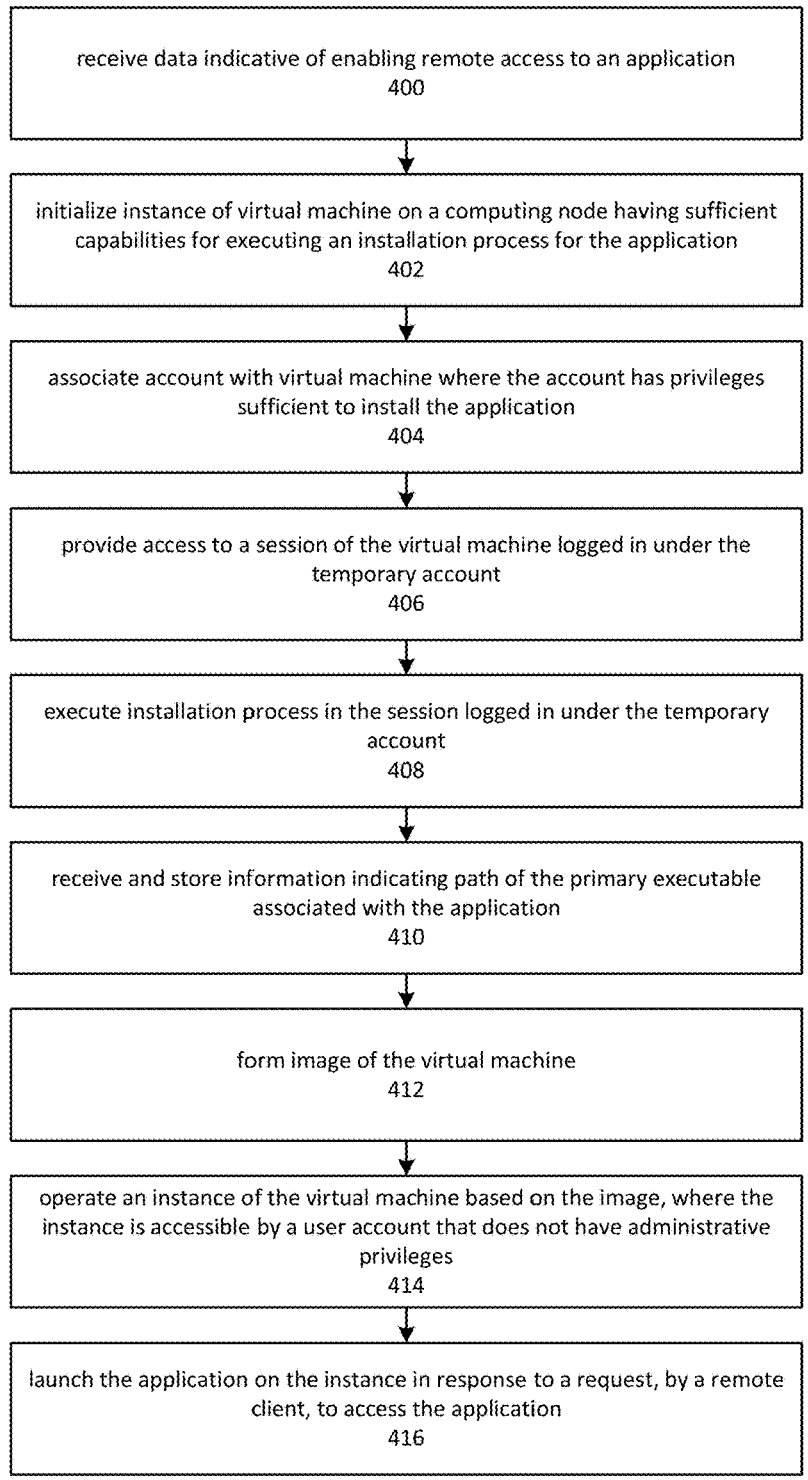
FIG. 4 is a flow diagram depicting an example of a process for enabling remote streaming of an application.

Aspects of the present disclosure may be better understood with reference to FIG. 4, which illustrates various aspects of enabling an application for remote streaming. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

As depicted by block 400, an embodiment may receive data indicative of enabling remote access to an application. The data may be transmitted from a remote client, such as a client-side console application for managing hosted services, and, in some cases and embodiments, may omit information pertaining to the specific application or applications for which remoting may be enabled.

Block 402 depicts the embodiment initializing an instance of a virtual machine. The embodiment may initialize the instance of the virtual machine on a computing node selected based on its capabilities as an installation platform. The selected computing node may, for example, have connectivity to data storage usable in the installation process. On the other hand, the selected platform might lack resources that might be used by the application after the application has been installed. This approach may permit conservation of resources and greater efficiency, since virtual machines with access to resources such as graphics cards—which are not typically used during installation—may be used to execute applications rather than to run installation processes.

Block 404 depicts an embodiment associating an account with the virtual machine, where the account has privileges sufficient to install the application. The account may be a temporary account. The credentials for the account, e.g., the user name and password, may be generated through a random or semi-random process, or some other method for generating non-deterministic credentials. Characteristics of a non-deterministic user name and password may include being unpredictable and difficult to guess. In various instances, the credentials are not known to the user or client that will interact with the virtual machine to install the application. The user or client in this case may possess a different set of credentials which may be used to log onto an administrative console, but that are not valid on the virtual machine. In other instances, the credentials may be those typically used for managing a user's account on the virtual machine.

The temporary account may have privileges sufficient to execute an installation process for an application. Typically, these might comprise various administrative privileges such as read and write access to certain storage locations, permission to modify registries, and so forth.

Block 406 depicts the embodiment providing access to a session of the virtual machine that is logged in under the temporary account added at block 404. Access may be provided in a number of ways. In some embodiments, the desktop of the session may be streamed to a client-side console application, through which a user may have direct interaction with the desktop through various input devices such as mice and keyboards. By providing this access, the client-side application may, at the direction of its user, cause an application installation process to be executed. Other embodiments may provide access in more restrictive ways. For example, an embodiment might provide a list of applications that might be installed. In each of these cases, the result may be to execute an installation process on the virtual machine, in the session that is logged in under the temporary account. The executing installation process may therefore utilize the administrative privileges granted to it by virtue of the session being logged in under the temporary account.

Block 408 depicts executing an installation process in the session of the virtual machine that is logged in under the temporary account. Embodiments may also, as depicted by block 410, receive and store information that indicates the path of one or more executables associated with the application. This information might be supplied by the client-side application in response to the direction of a user. In some cases, embodiments might extract the information from installation files or other similar means, or maintain a repository of information pertaining to the installation paths of programs that may be installed on the virtual machine.

Once received, the information may be stored. Embodiments may, for example, maintain an association between an application and its installation path, in order to use the information when subsequently called upon to initiate execution of the application.

As depicted by block 412, the embodiment may form data indicative of an image of the virtual machine. The data indicative of an image may, for example, comprise a complete image, a baseline image plus a delta, or a baseline image plus a customization procedure. The image may be taken or finalized subsequent to completion of the installation process, so that the image contains the files and configuration needed to execute the application. For example, an embodiment might receive an indication that an application, to which remote access is to be provided, has been installed. The embodiment might then form an image of the virtual machine by copying the virtual machine's storage devices and configuration.

Embodiments may, in some cases, utilize an image delta containing information that can be applied to a baseline image. The baseline image might, for example, be of a "clean" virtual machine which has yet to have any additional applications installed on it. The delta image might reflect changes made to the baseline image as a result of installing an application. This approach may be employed to reduce the time needed to deploy an application for streaming. A pool of virtual machines may be maintained, for example, in a suspended state corresponding to the baseline image. When deploying an application, a delta image can then be applied. After the delta image is applied to the baseline image, the virtual machine may be activated and the application may be executed.

In another embodiment, an application package may be applied to a baseline image, which may, in effect, cause the application to be installed on top of the baseline image. The application package may function in a manner similar to the delta image discussed in the preceding paragraph. In some instances, an application package may comprise a hybrid of delta-based updates to the baseline image and further customization based on various factors, such as the identity of the user(s) authorized to access the application.

Embodiments may, as depicted by block 414, operate one or more instances of the virtual machine. The instances may be based on the image formed in block 412, so that the image contains the files and configuration needed to execute the application. The instances may be made accessible to a user account other than the management user account used during the installation process. In some instances, the temporary account may be removed from the virtual machine, and a new account added, prior to forming the image in block 412. In other instances, the user account may be added after the instance is initialized based on the image.

Some embodiments may maintain a pool of instances in order to shorten response times when remote access to a previously installed application is requested. For example, a pool of ten computing nodes might be configured to operate ten instances of a virtual machine, each based on an image comprising the files and configuration for an installed application to which remote access is to be provided. At any given time, some portion of the virtual machine instances might be busy executing an application, while the remaining instances might be initialized but dormant.

As depicted by block 416, embodiments may launch the installed application on an instance of the virtual machine in response to a request from a remote client. The request from the client may include an indication that access to the application is requested. The request may include information that is indicative of the identity of the application, and might include additional information identifying a user or account with which the request for access is associated. This information may be used to locate a virtual machine that contains the files and configuration needed to execute the image, and to locate any executable files that are to be launched on the virtual machine instance. For example, during the installation process, the system may generate a link or identifier, which contains a unique identifier, for example containing credentials authorizing access to the remote application. This link and unique identifier may be valid for a predetermined period of time. In addition, the link or identifier launches the remote application when clicked by the user.

Figure 5:
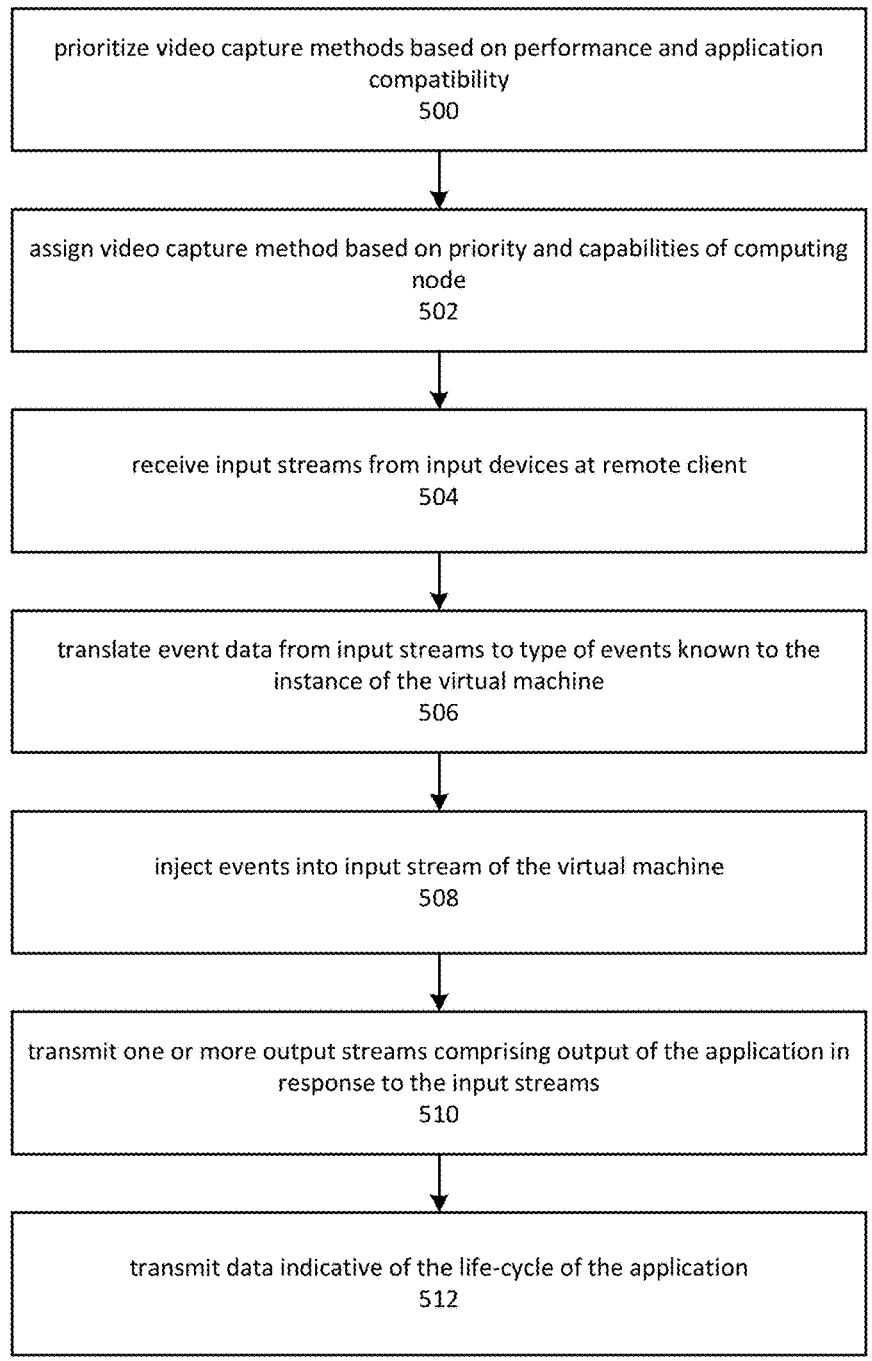
FIG. 5 is a flow diagram depicting an example of streaming an application to a remote client.

FIG. 5 is a flow diagram depicting an example of streaming the installed application to the remote client. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 500 depicts an embodiment prioritizing video capture methods on the virtual machine based on criteria that includes performance and application compatibility. Video capture refers to recording the visual output of an application so that the output can be streamed to a remote client. In some instances, the captured output may be limited to the output of the application. In other instances, the captured output may encompass the entire desktop of the session. Certain methods of capture may be highly efficient but not compatible with all applications, while others may be less efficient but more likely to be compatible. In some cases, a certain method of video capture may be suitable or preferable only when hardware such as a graphics card is available. Based on these and other factors, a priority for video capture methods may be established. As depicted by element 502, embodiments may assign a video capture method based on the priority of the method, the compatibility of the method with the application, and the availability of resources needed to utilize the method.

As depicted by block 504, embodiments may receive one or more input streams associated with various input devices of the remote client. In some instances, a set of common input types, such as mouse and keyboard input, may be transmitted from the remote client in response to input from a corresponding device. The input may then be injected into the input stream of the virtual machine, as depicted by element 508.

In some embodiments, information about various properties of the remote client device may be received and used to modify the execution of the local application. The embodiment then causes calls to various operating system functions that rely on the received properties to be intercepted. Next, parameters to the function are modified based on the values of the received properties, so that execution of the function on the virtual machine is adapted to the properties of the remote client. In one non-limiting example, an embodiment receives information about the size of the screen attached to the remote client. The embodiment causes a call to an operating system function for creating a window to be intercepted, and prior to continuing with execution of the function, modifies its parameters so that the window is created in a size that is compatible with the screen attached to the remote client. As a result, the window is created in a size that is compatible with the remote client's screen, rather than that of a screen that might be connected to the host of the virtual machine.

In some instances, event data from a remote client may correspond to a device that is not known to the virtual machine. For example, the remote client might accept touch or voice input, while the virtual machine might only support mouse and keyboard input. As depicted by block 506, embodiments may translate event data from the unsupported event type to a type that is known to the virtual machine. The translated event data may then be injected into the input stream of the virtual machine, as depicted by block 508.

The application executing on the virtual machine may respond to the injected input by producing various outputs. Block 510 depicts an embodiment transmitting one or more output streams that include the output of the application, as produced in response to the input streams. The output streams may comprise the desktop of the session of the virtual machine in which the application is running, or specifically include only the output of the application. In some embodiments, multiple streams may be employed. For example, a separate stream of output might be used for each of the application's windows, or for the mouse cursor. In some cases, less frequently updated output might be transmitted in a different stream than frequently updated output. The remote client may receive the various output streams and reconstruct the output on a display device.

As depicted by operation 512, embodiments may also transmit data that is indicative of various application life-cycle events. The data may be transmitted to the remote client, or to other applications for processing. Examples of life-cycle events include application startup and shutdown, opening and closing of documents, and so forth. The recipients of the information may process the data in various ways. For example, the remote client might receive an indication that a document has been saved and cause the document to be transferred to a hosted storage system, for later access by the user of the remote client.

In some instances, embodiments may receive information that indicates that a physical device has been attached to or is otherwise available on a remote device. The physical device might, for example, be a printer, game controller, haptic feedback device, audio speaker, and so on. In response to receiving the information about the physical device, embodiments may activate a virtual device on a virtual machine. The virtual device might, for example, include a device driver that emulates the device's behavior. Instructions for performing an operation might be directed at the virtual device. These may then be redirected to the physical device. For example, a command to print a document might be directed to the virtual device operating on the virtual machine, and then redirected to the physical device, e.g., a printer, for processing.

Figure 6:
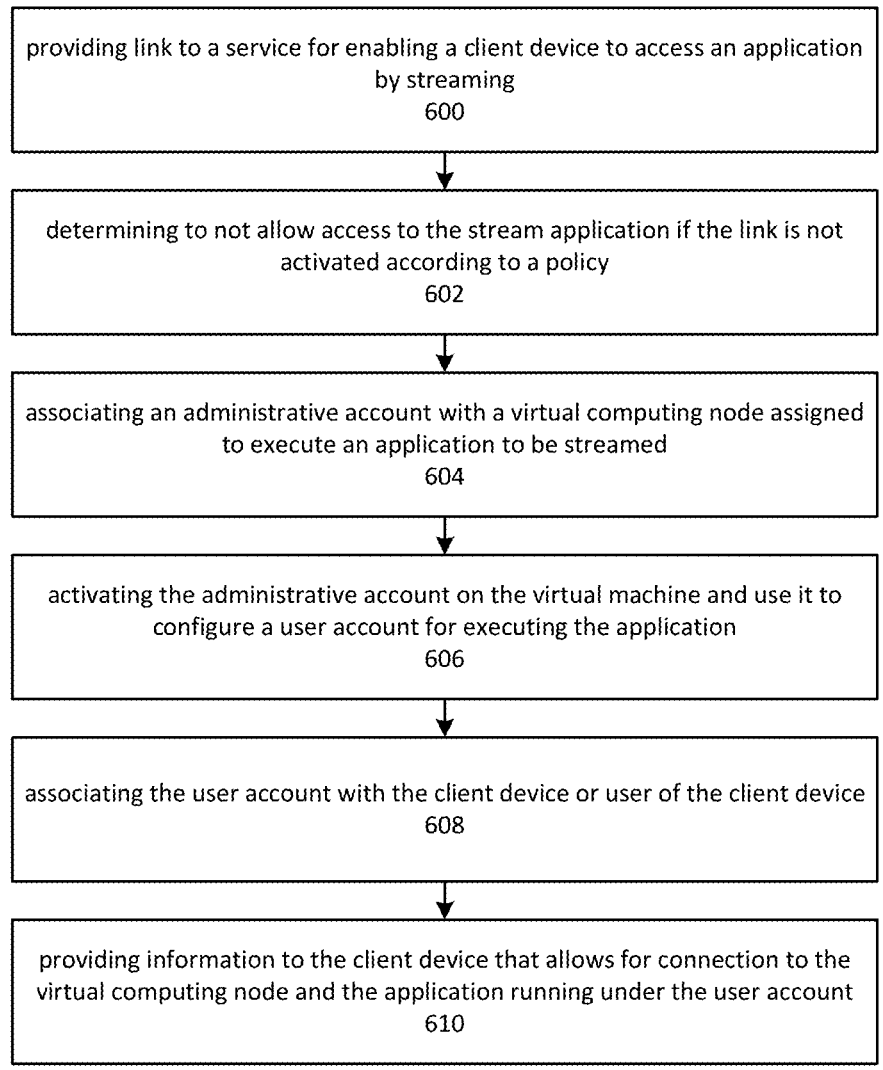
FIG. 6 is a flow diagram depicting establishing a stream between a client device and an application.

FIG. 6 is a flow diagram depicting establishing a stream between a client device and an application. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts an embodiment providing a link to a service for enabling a client device to access an application by streaming. The link may be transmitted through a console application, web page, dashboard, launch pad, or other similar mechanism. The link may be transmitted in response to a user selecting an application that is provided by the content provider and that the user wishes to stream to a client device. In other embodiments, the user may see all of the applications the user has access to in one place, for example, on a desktop or console.

Block 602 depicts an embodiment determining to not allow access to the stream application if the link is not activated according to a policy. This may comprise comparing information embedded in the link to various policies, such as those based on user credentials. This and other mechanisms may be used as security measures to reduce the risk of unauthorized use of a streamed application.

Block 604 depicts an embodiment temporarily associating an administrative account with a virtual computing node assigned to execute an application to be streamed. The temporary association allows an administrative account with an appropriate level of authority to do any initial configuration required to enable streaming. Block 606 depicts an embodiment activating the administrative account on the virtual machine and uses it to configure a user account for executing the application. In an embodiment, a virtual computing node that comprises the application to be streamed may be withdrawn from a pool of virtual computing nodes. An administrative account may be activated on the computing node and used to configure a user account that can then be used to run the program to be streamed. The administrative account can then be deactivated on the virtual computing node.

Block 608 depicts an embodiment associating the user account with the client device or user of the client device. Embodiments may utilize the association as a mechanism for controlling access to the application, and for controlling access to resources used by or produced by the application.

Block 610 depicts an embodiment providing information to the client device that allows for connection to the virtual computing node and the application running under the user account. This may be a token or other identifier, and could also include information such as an IP address, account name, and so forth. Passwords or other validating credentials may also be maintained in a manner that reduces the likelihood of an unauthorized user gaining access to the password or to the application.

In an embodiment, the information provided comprising a link (such as a hyperlink) that, when followed, results in the application being streamed from the content provider's virtual computing nodes to a browser or other receiving process operating on the client device. This link may contain a unique identifier or credentials, which are used to verify access to the virtual computing instance and may be good for only a predetermined period of time. The unique identifier or credentials alleviates the need for the user to enter a login and password in order to launch the remote application and may be generated in a way that is transparent to the user, for example being randomly generated during the installation process of the application.

The information may comprise an identifier of an application, such as a name or globally unique identifier. Embodiments may utilize the identifier to map to a pool of computing nodes, including virtual computing nodes, which are able to run the application. A variety of pooling strategies may be employed. In some instances, a separate pool may be maintained for each application. The number of computing nodes in a given pool might, in such cases, be configured based on expected utilization of the application associated with the pool. In other instances, a pool may be shared among multiple applications.

Aspects of the present disclosure may be better understood when considered in conjunction with the following examples. It will be appreciated that the following examples are intended to be illustrative, and should not be viewed as limiting.

In a first example, a system for providing a client device with access to an application may comprise a plurality of computing devices that, when activated, host a plurality of virtual computing nodes for executing applications streamed to client devices. The use of a streamed application may provide the client devices with access to the functions performed by the application, without requiring the client device to have the application installed locally. In addition, the use of a streamed application may provide the client device with access to the functions performed by the application, but without requiring the client device to have the hardware capabilities needed to run the application. For example, software such as computer-aided design software or graphics rendering applications may have certain hardware requirements that may not be available on a client device. Using application streaming, the software may be ingested into the content provider's computing infrastructure. Furthermore, aspects of the present disclosure may be utilized to reduce barriers to migrating the application from the client device to the content provider, such as word processing programs, etc.

The system may further comprise one or more memories having stored thereon computer-executable instructions that, upon execution by a computing device, cause the system at least to perform operations for providing a client device with streamed access to an application executing on one or more of the virtual computing nodes. The operations to provide access may be performed using minimized configuration steps and without requiring modification of the underlying application to work in a streamed environment.

The instructions may, upon execution, further cause the system to receive a request to provide access to the application on the client device, the request being an initial request of the client device for the application. The request may be issued when a user of the client device views a control console for an application streaming service, and selects an application for running locally. The request may be a result of the user following a link or pressing an "application deploy" button, for example. This form of deployment may be considered improved over some methods, such as those that require more extensive configuration to enable access to a streamed application.

The instructions may, upon execution, further cause the system to select one or more of the plurality of virtual computing nodes for executing the application, the selection based at least in part on an estimated capacity of the one or more of the plurality of virtual computing nodes. The computing capacity utilized by an application may vary. Computing nodes may be assigned based on comparing the computing capacity requirements of the application to those of the computing node(s) that might be selected for executing the application.

The instructions may, upon execution, further cause the system to associate the computing device with a user account and credentials for the account, wherein a plurality of virtual computing nodes are configured to execute the application in an execution context associated with the user account. In addition, the instructions, when executed, cause the application to execute on the one or more of the plurality of virtual computing nodes in the execution context associated with the user account. In this manner, access to the application and data created via the application may be restricted to an appropriate set of users. The user account may be a single user account or a group user account.

The instructions may, upon execution, further cause the system to identify a window and an input/output stream associated with the application, wherein the identifying is based at least in part on comparing a process identifier associated with the application to process identifiers associated with the window and input/output stream. Executing processes may be associated with an identifier, such as a numeric value, that may uniquely identify the application, or that may identify the application for at least the length of time that the application is running. Execution of the instructions may cause the system to track various resources used, modified, created, or deleted by the application. The resources may be tracked using process identifiers by comparing a process identifier associated with an application with other process identifiers, such as the identifiers associated with the creation of a resource, or associated with a resources use, modification, or deletion. In some cases, resources may be associated with a hierarchy or family tree of process identifiers. For example, a parent process may be associated with a first process identifier, and a child process created by the parent may be associated with a second identifier. If the parent process corresponds to the application that is to be streamed, resources associated with either the first identifier, the second identifier, or both might be identified.

The instructions may, upon execution, further cause the system to stream information indicative of the window to the client device, and to receive information indicative of input from the client device. Execution of the instructions may further result in causing the application to respond to the input from the client device by injecting the input into the input/output stream. A user of a client device may interact with the windows or other objects streamed from the content provider to the client device. This could, for example, comprise mouse moves, mouse clicks, keyboard input, and so forth. The input may be forwarded to the content provider and injected into the input/output stream of the application. As noted, the input/output stream may have been detected by the capture process using a process identifier of the application. This approach allows the input/output stream to be detected and utilized without requiring customization of the application for use as a streamed application.

In a second example, aspects of the first example may further comprise one or more memories having stored thereon computer-readable instructions that, upon execution by the one or more computing devices, cause the system at least to transmit data comprising a link to a service for enabling access to the application, wherein the link, when followed on the client device, causes the system to receive the request to provide access to the application. In this example, a client device may receive, for example, a web page containing a link to an application. By clicking on the link, the streamed application may be made accessible with little or no further configuration required by the user. For example, a user might determine that a current hardware configuration is not adequate to support a computer-aided design program. That program may then be conveniently migrated to the content provider's infrastructure. Once the user initiated the streamed application, it would be run on the content provider's infrastructure and streamed to the user without suffering performance degradation.

In a third example, which may be combined with the first and/or second examples in any permutation, the system may further comprise one or more memories having stored thereon computer-readable instructions that, upon execution by the one or more computing devices, cause the system at least to determine to not allow access to the application based at least in part on time that has elapsed between transmitting the web page comprising the link and the link being followed. This has the effect of limiting access to the application to a limited time period after the link was sent. For example, the link may contain a unique identifier which may be randomly generated during application installation and may be valid for only a predetermined period of time.

In a fourth example, which may be combined with the first through third examples in any permutation, the system may comprise an application that has not been adapted for streaming. The capture process allows existing applications to be used in an application streaming environment without requiring customization or adaptation to enable streaming. Previously, applications may have been adapted to streaming use by utilizing explicit declarations of resources that should be streamed, such as windows, files, input/output streams, and child processes.

In a fifth example, which may be combined with the first through fourth examples in any permutation, the system may further comprise one or more memories having stored thereon computer-readable instructions that, upon execution by the one or more computing devices, cause the system at least to identify a file modified by the application, and transmit data comprising a link to the file modified by the application. The resource may track files modified by the application using the process identifier of the application. In order to facilitate access to files, the content provider may transmit a web page or other user interface that contains links to the modified files. This approach allows for the files modified by the application to be accessed by the user without requiring explicit configuration or modification of the application to adapt it to a streaming environment.

In a sixth example, which may be combined with the first through fifth examples in any permutation, the system may further comprise one or more memories having stored thereon computer-readable instructions that, upon execution by the one or more computing devices, cause the system at least to identify a child process of the application, based at least in part on the process identifier associated with the application. The instructions may further cause the system to at least identify at least one of a window, an input/output stream, a file, or an additional child process associated with the child process, based at least in part on a second process identifier associated with the child process. Identification of resources affected by the streaming application allows for those resources to be injected into the client, or made available to the client, as part of the streaming process.

In a seventh example, which may be combined with the first through sixth examples in any permutation, the system may further comprise one or more memories having stored thereon computer-readable instructions that, upon execution by the one or more computing devices, cause the system at least to associate an administrative account on the one or more virtual computing nodes with the client device. The administrative account may be used to configure the computing nodes selected to run the application with an appropriate user account.

The instructions may further cause the system at least to activate the administrative account on the one or more virtual computing nodes. Using the activated account, the instructions may further, upon execution, cause the system to configure the user account on the one or more virtual computing nodes, the configuring performed done using the administrative account, the configuring performed in response to receiving the request to provide access to the application on the client device. After the user account has been created, execution of the instructions may further cause the system to deactivate the administrative account on the one or more virtual computing nodes. As an illustration, as part of an ingestion process the program files for a computer-aided design program might be copied to an image file for a virtual machine, and additional configuration done, under the administrative account. The user accounts might also be configured and enabled to run the program. The administrative account might then be deactivated. Additional operations to prepare the application for streaming might include pre-populating a pool of virtual computing nodes that are prepared to execute the application.

In an eighth example, which may be combined with the first through seventh examples in any permutation, the system may further comprise one or more memories having stored thereon computer-readable instructions that, upon execution by the one or more computing devices, cause the system at least to receive a request to make an application available for streaming to one or more client devices include the client device. The instructions may further cause the system to form, in response to receiving the request to make the application available for streaming to client devices, an image of a virtual computing node that comprises the application. The instructions may further cause the system to initialize, e.g., pre-populate a pool of virtual computing nodes using the image.

In a ninth example, which may be combined with the first through eighth examples in any permutation, the system may further comprise one or more memories having stored thereon computer-readable instructions that, upon execution by the one or more computing devices, cause the system at least to activate an administrative account on the one or more virtual computing nodes associated with the client device. The instructions may further cause the system to configure the user account to have access to the application using the administrative account. The instructions may further cause the system to deactivate the administrative account on the one or more virtual computing nodes associated with the client device.

In a tenth example, which may comprise aspects of the preceding examples in any permutation, a computer-implemented method may comprise receiving a first request to make an application available to stream to a plurality of client devices, the plurality of client devices comprising a first client device. The method may further comprise pre-populating a pool of virtual computing nodes, wherein each virtual computing node in the pool comprises the application. These aspects of the tenth example may permit embodiments to respond to a request to stream an application to a particular client with little or no delay.

The method may further comprise receiving a second request to provide access to the application on the first client device, selecting a first virtual computing node from the pool of virtual computing nodes, and associating the first computing device with a user account and credentials for the account, wherein first computing node is configured to execute the application in an execution context associated with the user account.

The method may further comprise transmitting instructions to the first client device, wherein the instructions, when executed, cause the application to execute on the first computing node in the execution context associated with the user account.

The method may further comprise identifying a window and an input/output stream associated with the application, wherein the identifying is based at least in part on comparing a process identifier associated with the application to process identifiers associated with the window and input/output stream.

The method may further comprise streaming information indicative of the window to the first client device, receiving information indicative of input from the first client device, and inserting, sometimes referred to as injecting, the input into the input/output stream associated with the application.

It will be appreciated that the system and method described above may further be reflected, in various permutations, in computer-readable media and computer program products comprising for performing the operations described in the examples.

Figure 7:
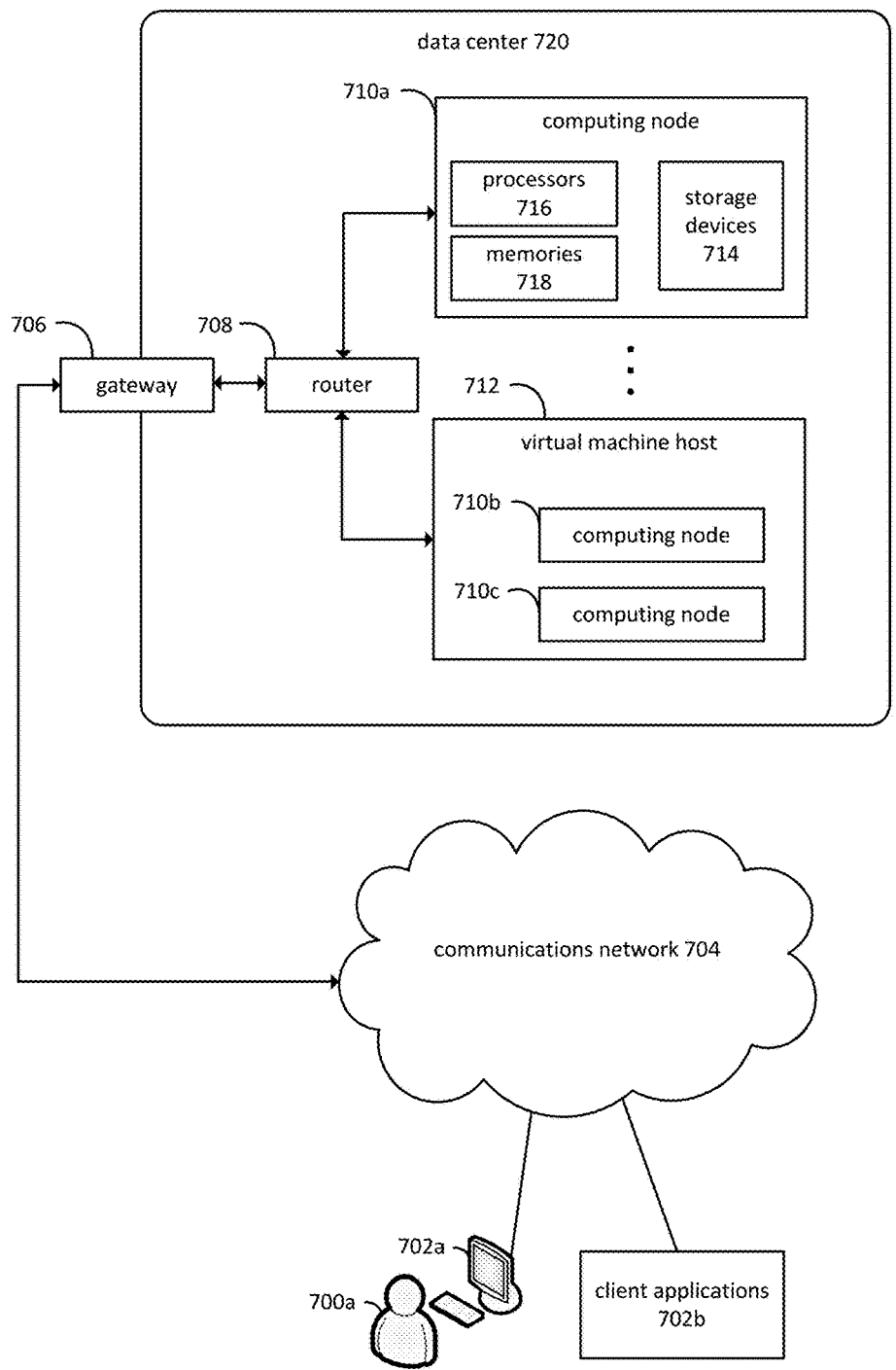
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
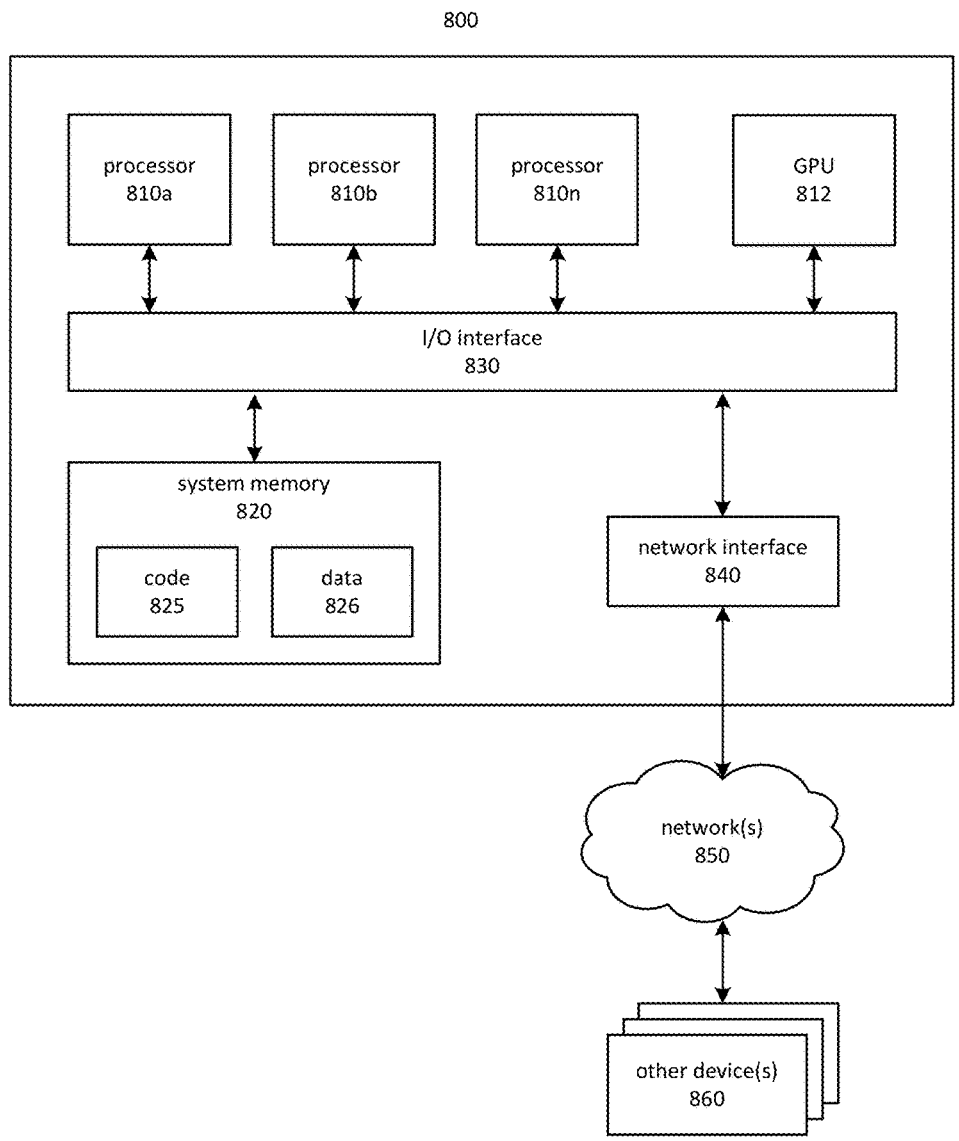
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more processors; and
one or more memories having stored thereon computer-executable instructions that, upon execution, cause the system at least to:
receive information indicative of enabling remote access to an application;
configure a virtual machine to be accessible to a first user account having a privilege to install the application on the virtual machine;
provide access to a first session on the virtual machine, wherein the first user account is logged into the first session;
execute an installation process for the application in the first session of the virtual machine;
generate a link associated with the application, wherein the link includes a unique identifier of the application;
form an image based on a state of the virtual machine subsequent to execution of the installation process, wherein the image comprises files and configuration of the application, the files and the configuration based at least in part on the installation process;
receive the unique identifier of the application based at least in part on accessing the link by a second user account associated with a remote client;
identify a plurality of virtual computing nodes initialized using the image, the plurality of virtual computing nodes identified based at least in part on a mapping between the unique identifier of the application and the plurality of virtual computing nodes;
launch the application on an instance of the virtual machine associated with one or more of the plurality of virtual computing nodes, wherein the instance is based at least in part on the image; and
stream, to the remote client graphical output from the application executing in a second session.

2. The system of claim 1, further comprising one or more memories having stored thereon computer-readable instructions that, upon execution, cause the system at least to:
provide access to the first session by streaming graphical output from a desktop of the first session.

3. The system of claim 1, further comprising one or more memories having stored thereon computer-readable instructions that, upon execution, cause the system at least to:
maintain a plurality of instances of the virtual machine, the plurality of instances based at least in part on the image.

4. The system of claim 1, further comprising one or more memories having stored thereon computer-readable instructions that, upon execution, cause the system at least to:
identify a computing device to operate the instance of the virtual machine based at least in part on comparing capabilities of the computing device to capabilities associated with executing the application.

5. A method of streaming an application to a remote client, the method comprising:
receiving information indicative of enabling remote access to the application;
configuring a virtual machine to be accessible to a first user account having privileges sufficient to install the application on the virtual machine;
executing an installation process for the application in a first session on the virtual machine, the first user account logged into the first session;
forming an image based on a state of the virtual machine, wherein the image is formed to comprise a configuration of the application based at least in part on execution of the installation process;
generating a link associated with the application, wherein the link includes an identifier associated with the application;
receiving the identifier of the application based at least in part on accessing the link by a second user account associated with a remote client;
identifying a plurality of virtual computing nodes initialized using the image, the identifying based at least in part on a mapping between the identifier of the application and the plurality of virtual computing nodes;
launching the application on an instance of the virtual machine associated with one or more of the plurality of virtual computing nodes, the instance based at least in part on the image and the image comprising the application, the instance accessible to the second user account; and transmitting, to the remote client, graphical output from the application executing in a second session associated with the second user account.

6. The method of claim 5, further comprising:
executing the installation process based at least in part on information indicative of user input received from the remote client; and
transmitting graphical output from a desktop of the first session during execution of the installation process.

7. The method of claim 5, wherein the installation process is triggered by interaction with a desktop of the first session.

8. The method of claim 5, further comprising:
maintaining a plurality of instances of the virtual machine, the plurality of instances based at least in part on the image.

9. The method of claim 5, further comprising:
receive information indicative of a physical device associated with the remote client;
install a virtual device on the virtual machine in response to receiving the information indicative of the physical device, the virtual device representative of the physical device; and
transmit to the remote client information indicative of operations directed to the virtual device for performance on the physical device.

10. The method of claim 5, further comprising:
receiving, from the remote client, data indicative an interaction with an input device;
interpreting the data; and
inserting the interpreted data into an input stream of the second session.

11. The method of claim 5, further comprising:
storing information identifying the application being accessible to the remote client.

12. The method of claim 5, further comprising:
identifying a computing device to operate the instance of the virtual machine based at least in part on comparing capabilities of the computing device to capabilities associated with executing the application.

13. A non-transitory computer-readable storage medium having stored thereon instructions that, upon execution by one or more computing devices, cause the one or more computing devices at least to:
receive information indicative of enabling remote access to an application;
configure a virtual machine operating on one of the plurality of computing devices to be accessible to a first user account having privileges sufficient to install the application on the virtual machine;
provide access to a first session on the virtual machine, the first user account logged into the first session;
execute an installation process for the application in the first session of the virtual machine;
form an image based on a state of the virtual machine, the image formed to comprise a configuration of the application based at least in part on execution of the installation process;
generate a link associated with the application, wherein the link includes an identifier associated with the application;
receive the identifier of the application based at least in part on accessing the link by a second user account associated with a remote client;
identify a plurality of virtual computing nodes initialized using the image, the plurality of virtual computing nodes identified based at least in part on a mapping between the identifier of the application and the plurality of virtual computing nodes;
launch the application on an instance of the virtual machine associated with one or more of the plurality of virtual computing nodes, the instance based at least in part on the image and the image comprises the application, the instance accessible to the second user account; and
stream, to a remote client, graphical output from the application executing in a second session associated with the second user account.

14. The non-transitory computer-readable storage medium of claim 13, comprising further instructions that, upon execution by the one or more computing devices, cause the one or more computing devices to at least:
provide access by streaming graphical output from a desktop of the first session.

15. The non-transitory computer-readable storage medium of claim 13, comprising further instructions that, upon execution by the one or more computing devices, cause the one or more computing devices to at least:
maintain a plurality of instances of the virtual machine, the plurality of instances based at least in part on the image.

16. The non-transitory computer-readable storage medium of claim 13, comprising further instructions that, upon execution by the one or more computing devices, cause the one or more computing devices to at least:
receive information indicative of a first property, the first property associated with the remote client;
intercept an operation of the virtual machine associated with a second property, the second property associated with the virtual machine; and
perform the operation on the virtual machine using the first property.

17. The non-transitory computer-readable storage medium of claim 13, comprising further instructions that, upon execution by the one or more computing devices, cause the one or more computing devices to at least:
receive, from the remote client, data indicative an interaction with an input device;
interpret the data; and
insert the interpreted data into an input stream of the second session.

18. The non-transitory computer-readable storage medium of claim 13, comprising further instructions that, upon execution by the one or more computing devices, cause the one or more computing devices to at least:
store information indicative of a location of the application installed on the virtual machine.

19. The non-transitory computer-readable storage medium of claim 13, comprising further instructions that, upon execution by the one or more computing devices, cause the one or more computing devices to at least:
identify a computing device to operate the instance of the virtual machine based at least in part on comparing capabilities of the computing device to capabilities associated with executing the application.

* * * * *